April 22, 1969 W. W. MARTIN 3,439,505
IRRIGATION FLOW CONTROL AND METHOD OF INSTALLING
Filed Aug. 1, 1967 Sheet 1 of 2

INVENTOR
WILLIS W. MARTIN

BY

ATTORNEYS

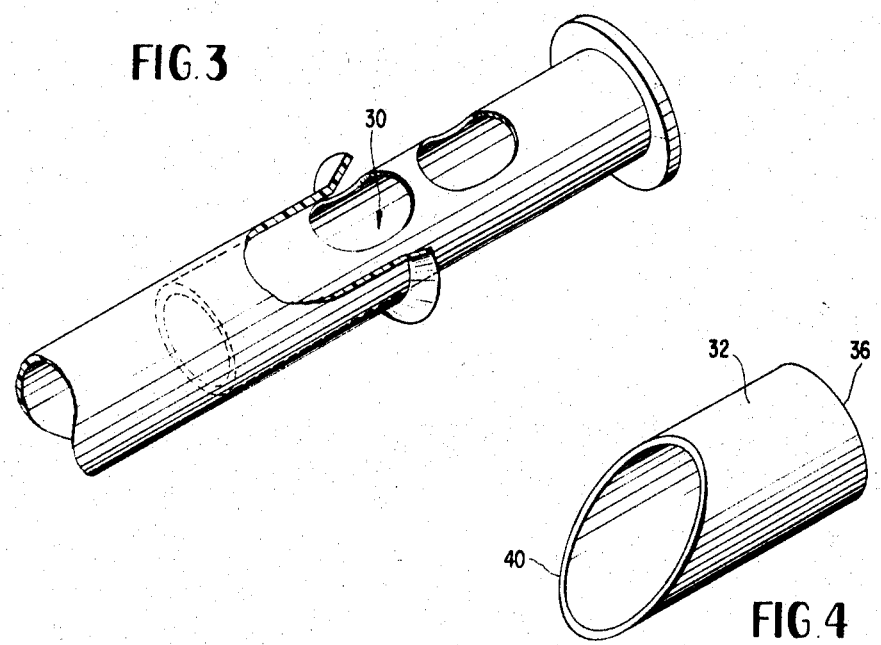
FIG. 3
FIG. 4
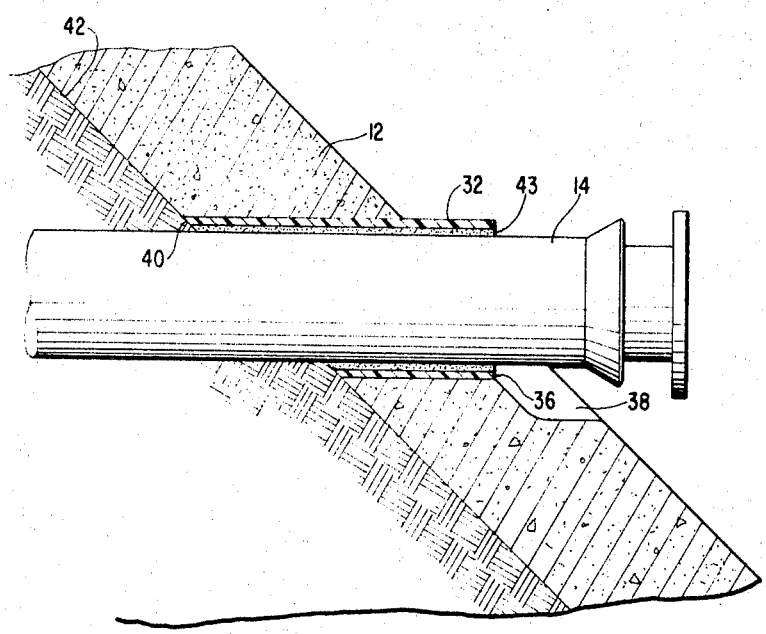
FIG. 5

United States Patent Office 3,439,505
Patented Apr. 22, 1969

3,439,505
IRRIGATION FLOW CONTROL AND METHOD
OF INSTALLING
Willis W. Martin, Box 1550,
Riverton, Wyo. 82501
Continuation-in-part of application Ser. No. 587,748,
Oct. 19, 1966. This application Aug 1, 1967, Ser.
No. 662,257
Int. Cl. E02b 13/02
U.S. Cl. 61—12                                    5 Claims

ABSTRACT OF THE DISCLOSURE

An irrigation flow control device suitable for installation in the wall of an irrigation ditch at the time of lining the ditch with concrete includes a primary tubular member of sufficient length to project from the inner surface of the lined ditch through and beyond the wall thereof. A secondary tubular member, closed at its inner end, has a diameter permitting relatively tight telescoping of the open end of the tube into the inner end of the primary tubular member to close the primary tubular member when in a fully telescoped position. The secondary tubular member includes at least one opening in the wall thereof, various extents of which opening may be exposed beyond the inner end of the primary tubular member to effect control of the amount of water permitted to flow in and through the flow control device. The device also includes a sleeve extending loosely about the primary tubular member. The sleeve may be prepositioned in the concrete wall during setting and the primary tube inserted thereafter, in order to protect the latter against deformation due to forces exerted on it by the concrete while unset.

Related application

This application is a continuation-in-part of applicant's copending application Ser. No. 587,748 filed on Oct. 19, 1966, for an "Irrigation Flow Control Device," now abandoned.

Background of the invention

This invention relates to an irrigation flow control device of the type used to regulate the flow of water from an irrigation ditch.

In irrigating land, it is common to direct water along imperviously lined, irrigation ditches from which the water is distributed at suitably spaced points to furrows or the like provided in the surface of the land. The ditches usually included concrete lined side walls which are provided with side openings spaced at suitable intervals through which the water may flow to the furrows.

Various forms of the side opening may be provided, one of the simplest being a fixed-dimensional opening produced by methods such as prepositioning of a removable mold in the concrete, manual shaping of the concrete during setting, or the like. Fixed openings of this sort, however, do not permit ready variation of water flow, as may be desirable, and may additionally require undue amounts of labor for their construction.

Other forms of side opening intended to obviate the disadvantages of the previously described fixed openings involve the provision of a tubular body prepositioned in the ditch prior to lining thereof, and provided wtih a flow-controlling gate valve at one end of the body. Prior structures of this type may however, prove unsatisfactory for a number of reasons. For example, it is frequently necessary to provide temporary supports for prepositioning the bodies in the ditch prior to laying of the concrete, in which event, additional labor and material costs are incurred in the provision and subsequent removal of the temporary supports. Also, the provision of gate valves involves unnecessary structural complexity while the seating qualities of such valves become progressively degraded during severe conditions of use.

Another problem may arise if the tube is insufficiently rigid to withstand the setting forces exerted upon it by the concrete while the latter is still wet, in which event the tube may become distorted in shape thereby possibly affecting the operation of any flow controlling portions with which the tube may be provided.

Additionally in some prior forms of irrigation conduit, the inlet to the conduit is particularly prone to becoming clogged with floating leaves, twigs and other material frequently found floating in irrigation ditches, with the result that the flow of water to the land to be irrigated may sometimes be seriously reduced.

For these reasons, there is a need for an irrigation flow control device which can be cheaply and rapidly installed in the concrete side walls of irrigation ditches and in which the flow controlling properties of the device will not become degraded during long periods of use under severe operating conditions.

Summary of the invention

It is therefore a general object of the invention to provide an irrigation flow control device designed to minimize problems of the type described.

It is a particular object of the invention to provide an irrigation flow control device capable of being installed in a concrete side wall of an irrigation ditch with a minimum of effort at the time of lining the ditch and prior to the setting of the concrete.

It is another object of the invention to provide an irrigation flow control device so uniquely constructed that effective control of rate of water flow can be maintained despite continuous use of the device over long periods under severe operational conditions.

It is a further object of the invention to provide a tubelike irrigation flow control device wherein the possibility that the tube shape may be distorted by forces exerted on it by a concrete lining during setting of the concrete is effectively minimized.

It is another object of the invention to provide a prepositioned sleeve which may be inserted in a concrete lined ditch during the lining process to facilitate subsequent installation of an irrigation flow control device.

It is a final object of the invention to provide an irrigation flow control device so constructed as to minimize unwanted reduction of flow through the device caused by floating detritus in the irrigation water such as leaves, twigs and the like.

These objects are accomplished in accordance with a preferred embodiment of the invention by an irrigation flow control device adapted to be installed in an irrigation ditch at the time of lining the ditch with concrete. The flow control device includes a primary tubular member of a length requisite to project from the inner surface of the lined irrigation ditch through and beyond the wall thereof. A secondary tubular member closed at one end, has a diameter permitting relatively tight telescoping of the open end portion of the secondary tubular member into the inner end of the primary tubular member. The secondary tubular member closes the primary tubular member in a fully telescoped position. The secondary tubular member includes at least one opening in its wall, various extents of which opening may be exposed beyond the inner end of the primary tubular member to effect control of the amount of water permitted to flow through the flow control device.

In a significant aspect of the invention, the outward end of the primary tubular member is provided with at least one tooth-like serration to facilitate rotary driving thereof through the concrete lining and side wall of the ditch.

In another important aspect of the invention, a rigid tubular sleeve may be prepositioned in the concrete lining prior to setting thereof, in order to protect a subsequently inserted flow control device of the type described, from deformation by forces exerted by the concrete during setting.

*The drawings*

A preferred embodiment of the invention is illustrated in the accompanying drawings, in which:

FIGURE 1 is a perspective view of a portion of an irrigation ditch provided with three irrigation flow control devices according to the present invention, with the ditch shown partially in section to illustrate the manner in which the flow control device is installed; and FIGURE 2 is a perspective, partly sectional view of a preferred embodiment of the irrigation flow control device of the present invention;

FIGURE 3 is a perspective, partly sectional view of a second embodiment of the irrigation flow control device;

FIGURE 4 is a perspective view of a sleeve which may be utilized in conjunction with the irrigation flow control devices shown in FIGURES 1 and 3; and FIGURE 5 is a cross sectional side view of the sleeve shown in FIGURE 4 installed in a lined ditch.

*Detailed description*

Figure 1:
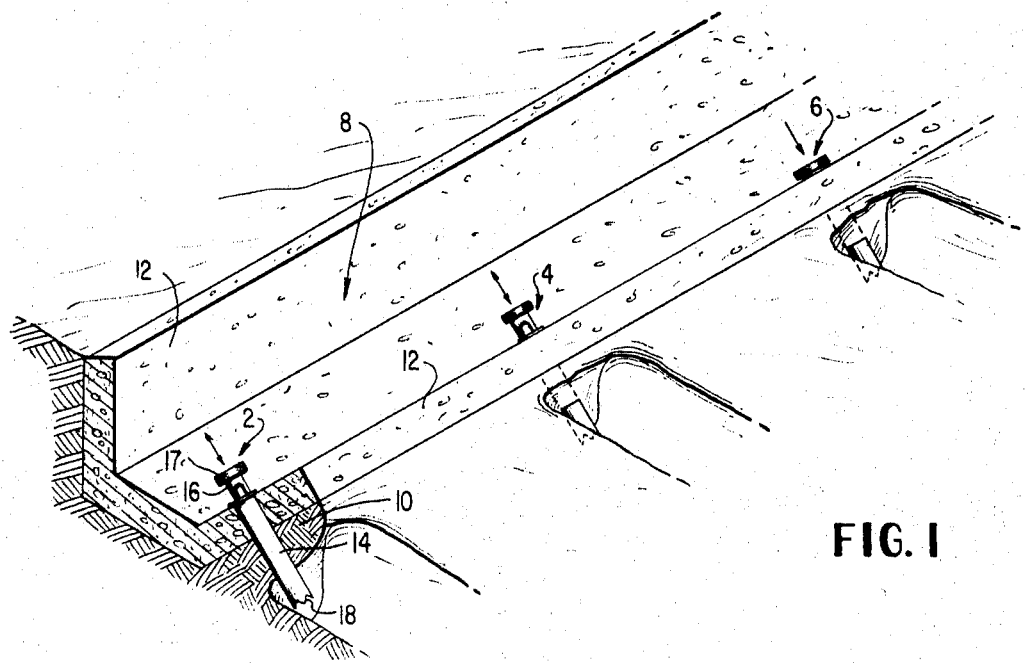

Referring to FIGURE 1 of the drawings, three identical irrigation flow control devices 2, 4 and 6 according to the preferred form of the present invention are there shown installed in an irrigation ditch 8. The irrigation ditch 8 is of the type including earthen banks 10 lined by concrete side walls 12 of relatively uniform thickness. The irrigation flow control device includes a primary outer tubular member 14 extending through one concrete side wall lining 12 and the adjacent earthen bank 10. Telescopingly received in the outer member 14 is a secondary inner tubular member 16 closed at its inner end by a radially extending cap 17 and provided with an axially extending slot 18 in its periphery varying portions of which may be exposed to the water within the irrigation ditch to control the flow of water through the control device.

Figure 2:
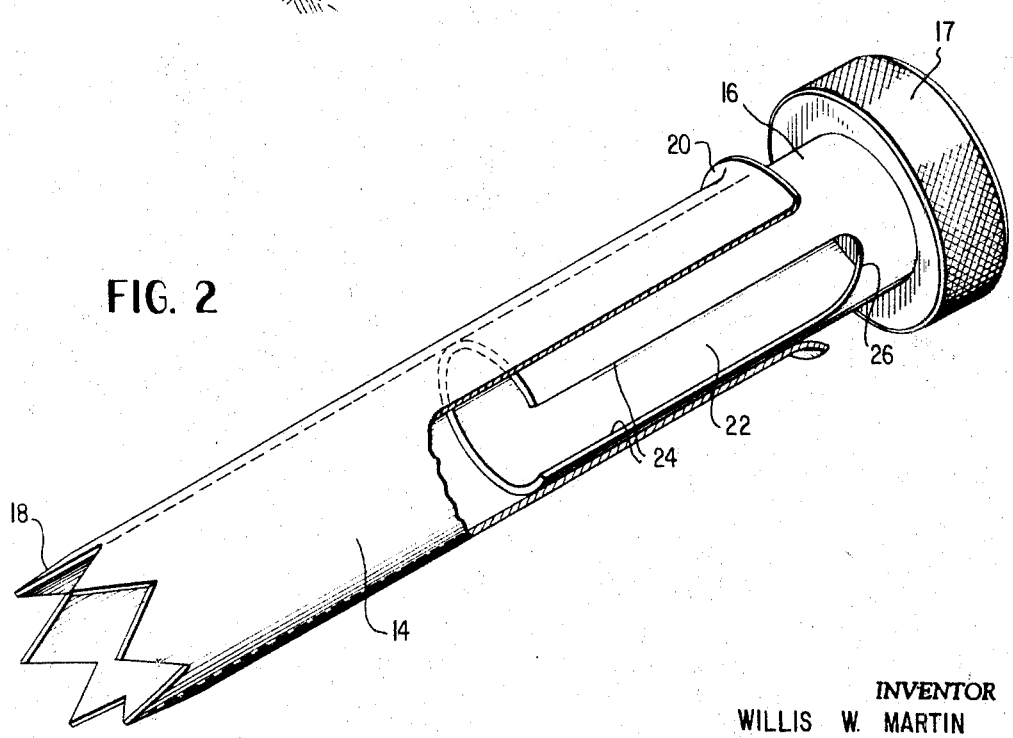

Referring in more detail to FIGURE 2, the exemplified previously mentioned outer member 14 is provided with a plurality of radially spaced, saw-tooth like, serrations 18 at its forward end and with a bell shaped flange 20 at its inner end.

The flow control device is installed in the irrigation ditch after the concrete lining has been placed in position in the ditch but while the concrete is still in a relatively soft condition during and prior to setting. A workman grasping the flow control device by the inner end imparts a combined rotating and outwardly directed, driving force to the outer tube 14 so that the serrations 18 cut their way through the concrete side wall lining 12 and the adjacent portion of the bank 10. The workman continues to advance the device through the side wall lining 12 until the flange 20 abuts the inner surface of the side wall, in which position the outward extremity of the tube 14 projects outwardly of the bank.

That portion of the cement lying within the tube 14 subsequent to installation of the device as described may be flushed and rammed out in any suitable manner.

The concrete lining 12 subsequently sets about the outer tube 14 thus firmly anchoring the tube to the wall of the ditch.

The previously mentioned inner tube 16 is relatively shorter than the outer tube 14 and is provided with the peripheral slot 18 defined by two radially spaced edges 24 extending axially from the outward end of the inner tube 16 to an arcuate transverse edge 26 adjacent and spaced from the end cap 17.

The end cap 17 is provided with knurled portions about its peripheral edge so that it may easily be gripped to move the inner tube 16 relative to the outer tube 14.

In a zero flow position, the cap 17 abuts the flange 20 with the slot 18 lying entirely within the outer tube 14. In this position the slot 18 is entirely covered by adjacent surface portions of the outer tube 14 so that no water may flow through the control device. Flow control device 6 in FIGURE 1 is shown in this condition. As the inner tube 16 is pulled axially from the outer tube 14, portions of the slot 18 are progressively exposed to the water within the ditch 8 so that water may flow through the exposed portion of the slot 18 into the outer tube 14 and out to the land to be irrigated.

The previously mentioned relatively tight frictional engagement provided between the inner and outer tubes 16 and 14 respectively, ensures that the axial position of the slot 18 relative to the outer tube 14 once set is thereafter maintained without being altered by external forces such as fluid forces, gravity or the like.

It will be seen that the construction described permits the rate of flow of water through the flow control device to be increased or decreased by respectively increasing or decreasing the axial extent of that portion of the slot 18 exposed to the water in the ditch by moving the inner tube 16 out or in of the outer tube 14.

Although in FIGURE 1 for clarity the irrigation devices are shown installed in the ditch with their inlet openings facing vertically, upwardly, it is usual to twist the inner tubes 16 round until the slots 22 are facing downstream. In this manner twigs, leaves and other detritus flowing downstream with the water in the conduits are substantially prevented from entering and blocking the inlets to the flow control devices, thereby reducing the risk of unwanted reduction of water flow.

An alternative embodiment of the invention shown in FIGURE 3 includes an irrigation flow control device having a structure otherwise identical to that for the preferred embodiment previously described but wherein the single slot 22 in the secondary member 16 is replaced by a plurality of axially spaced, separate openings 30 having closed peripheries. The openings 30 are of generally circular configuration having their centers disposed in axial alignment. It will be appreciated that openings 30 of differing configuration such as for example oval, diamond or other shapes may be provided. Portions of the secondary member 16 intermediate adjacent ones of the openings 30 provide additional stiffening for the secondary member which may be advantageous, for example in situations where unusually high water pressures are likely to be exerted upon the flow control device. Additionally the provision of a series of apertures provides a screening effect whereby twigs of particularly large size, small frogs or other similar sized objects likely to cause clogging of the device are prevented from entering the interior of the secondary member.

A third embodiment of the invention shown in FIGURES 4 and 5 utilizes a tubular sleeve 32 of requisite length to extend through the concrete lining 12 for receiving the previously described outer tube 14 of the flow device. The sleeve 32 is of sufficient internal diameter to loosely receive the outer tube 14 in concentric relation therewith.

The sleeve 32 is inserted in the lining 12 while the latter is still wet or may, if it is so desired, be prepositioned in the ditch prior to lining thereof with concrete either event the outer tube 14 of the flow control device may be inserted through the tube 32 either during or subsequent to the setting of the lining 12 about the tube 32.

The tube 32 protects the outer tube 14 from forces exerted by the concrete during setting thereof. In the absence of the sleeve 32, these forces may under unusual circumstances cause distortion of the shape of the outer tube 14, sufficient to reduce the efficiency of the fluid seal provided between the outer and inner tubes 14 and 16 and to reduce the ease with which relative motion of the tubes for adjustment of water flow may be effected.

The tube 32 is provided with an inner radial end 36 lying in plane disposed perpendicularly to the axis of the sleeve 32. When the sleeve is installed the inner end 36 projects inwardly of the concrete lining. A recessed portion 37 may be provided in the lining in the area subjacent the sleeve 32 if so desired.

The tube 32 also includes an outer end 40 lying in a plane inclined slantwise to the axis of the tube 32. The concrete lining 12 and the adjacent ditch will define an interface 42 inclined at an angle to the horizontal, central axis of the sleeve 22, to which the slantwise inclination of the outer radial end 40 generally conforms. In this manner the radial outer end of the tube rests generally flush against the earthen portion of the ditch wall.

After installation, caulking compound 43 is forced between the sleeve 32 and the adjacent surface of the outer tube 14 to connect them in sealed water-tight relation. This seal prevents seepage along the exterior of the outer tube 14 to keep the earthen portion of the ditch wall in generally dry condition, thereby reducing errosion of the ditch wall and obviating so called "frost heave" problems, caused by freezing expansion in cold weather of water present in the earthen bank adjacent the lining, which might crack the concerte lining.

In order to minimize the deleterious effects of weather conditions encountered in normal use of the flow control device, such as those caused by freezing of the water, harsh sunlight and the like, and also to avoid the ill effects of rusting, the tubes 14 and 16 and the sleeve 32 may be made of plastic material such as polyethylene or the like. However, it will be appreciated that other suitable materials may be employed.

In utilizing an irrigation flow control device according to the present invention, it will be seen that a particularly simple and reliable control of rate of water flow from an irrigation ditch may be achieved.

Particular advantages are provided by the serrated end of the outer tube which permit the device to be drivingly rotated by a workman through a side wall of the ditch during setting of the concrete lining with a minimum of effort thereby simplifying installation of the device.

Although the invention has been described with reference to a preferred embodiment, it will be apparent to those skilled in the art that additions, deletions, modifications, substitutions and other changes not specifically described and illustrated in the preferred embodiment may be made which will fall within the purview of the appended claims.

I claim:
1. In combination,
    a longitudinally extending irrigation ditch defined by spaced opposed earthen ditch walls of predetermined thickness,
    a concrete lining of predetermined thickness installed in the ditch with the concrete lining being in an initial, partially set, relatively soft condition.
    a primary tubular member of a length requisite to project from the inner surface of the lined irrigation ditch through and beyond the wall thereof,
    a secondary tubular member closed at one end and having a diameter permitting relatively tight telescoping of the open end portion thereof into the inner end of said primary tubular member to close said primary tubular member when in fully telescoped position, said secondary tubular member having,
        at least one opening in the wall thereof, various extents of which opening may be exposed beyond the inner end of said primary tubular member to effect control of the amount of water permitted to flow in and through said flow control device; and
    cutting means on the outer end of said primary tubular member to enable said primary tubular member to be cuttingly advanced into and through the soft concrete lining and ditch wall during installation, subsequent setting of the concrete to a fully hardened condition anchoring said primary tubular member permanently in said lining and said ditch wall.
2. The combination as defined in claim 1 further including:
    an outwardly extending circumferential flange on the inner end of said primary tubular member, said flange resting substantially flush with the inner surface of the concrete lining to limit advancing motion of said primary tubular member through said lining during installation.
3. The combination as defined in claim 1 wherein said cutting means includes,
    at least one sawtoothlike, axial projection on the outer end of said primary tubular member to facilitate rotary driving of said primary tubular member through the newly placed concrete lining and said earthen ditch wall.
4. In combination,
    a longitudinally extending irrigation ditch defined by spaced opposed earthen ditch walls of predetermined thickness,
    a concrete lining of predetermined thickness installed in the ditch,
    a primary tubular member of a length requisite to project from the inner surface of the lined irrigation ditch through and beyond the wall thereof,
    a secondary tubular member closed at one end and having a diameter permitting relatively tight telescoping of the open end thereof into the inner end of said primary tubular member to close said primary tubular member when in fully telescoped position,
    said secondary tubular member having at least one opening in the wall thereof, various extents of which opening may be exposed beyond the inner end of said primary tubular member to effect control of the amount of water permitted to flow in and through said flow control device,
    a tubular sleeve extending concentrically about and loosely embracing said primary tubular member, said sleeve being of requisite length to extend through the concrete lining portion of the ditch, and
    caulking means between said sleeve and said primary tubular member for providing fixed, sealed connection therebetween.
5. A method of irrigation of land comprising the steps of,
    banking earth into spaced earthen walls defining an irrigation ditch for water,
    lining the ditch internally with a layer of concrete,
    forcing an outer tubular body transversely outwardly from the interior of the ditch through the concrete lining while the lining is still in a soft condition and through the ditch wall until the outer body extends between the interior of the lined ditch and the outside of the ditch wall,
    slidably and sealingly mounting an inner tube within the outer tube with the inner tube having a closed end projecting into the interior of the lined ditch,
    providing a slot in the inner tube which is at least partially exposed beyond the outer tube to permit water flow through the tubes outwardly of the ditch,
    allowing the concrete to harden about the outer tube to fixedly secure the outer tube in the ditch; and
    telescoping the inner tube relative to the outer tube to vary the amount of partial exposure of the slot to vary the water flow through the tubes.

(References on following page)

References Cited

UNITED STATES PATENTS

| | | | |
|---|---|---|---|
| 559,651 | 5/1896 | Willard | 251—353 |
| 625,860 | 5/1899 | Thornton | 61—12 |
| 648,455 | 5/1900 | Farson | 251—353 X |
| 1,112,724 | 10/1914 | Schneider | 61—12 |
| 1,625,176 | 4/1927 | Warmoth | 94—33 X |
| 1,905,919 | 4/1933 | Levis | 210—460 |
| 2,776,169 | 1/1957 | Aschenbrenner | 61—12 X |

EARL J. WITMER, *Primary Examiner.*